(12) United States Patent
Kagawa et al.

(10) Patent No.: US 6,579,560 B2
(45) Date of Patent: Jun. 17, 2003

(54) SOYBEAN PROCESSED FOOD AND METHOD OF PRODUCING THE SAME

(75) Inventors: Masaru Kagawa, Osaka (JP); Koichiro Shioaki, Ashiya (JP); Rumi Tsuchiya, Itami (JP); Noriaki Hayashi, Ikoma (JP); Takahiko Mitani, Kyoto (JP)

(73) Assignee: Sanko Corporation, Osaka (JP)

( * ) Notice: Subject to any disclaimer, the term of this patent is extended or adjusted under 35 U.S.C. 154(b) by 140 days.

(21) Appl. No.: 09/802,459

(22) Filed: Mar. 9, 2001

(65) Prior Publication Data

US 2001/0028907 A1 Oct. 11, 2001

(30) Foreign Application Priority Data

Mar. 10, 2000 (JP) .......................... 2000-066425

(51) Int. Cl.$^7$ .................................. A23L 1/20
(52) U.S. Cl. ........................ 426/634; 426/459
(58) Field of Search .................. 426/634, 459

(56) References Cited

U.S. PATENT DOCUMENTS 3,635,726 A * 1/1972 Sair
4,490,406 A   12/1984 Ferrero et al.
4,746,521 A * 5/1988 Niwano et al.

FOREIGN PATENT DOCUMENTS

| DE | 43 02 183 C | 7/1994 |
| EP | 0 362 396 A1 | 4/1990 |
| JP | XP-002171478 | 8/1994 |
| JP | 11-9176 | 1/1999 |
| JP | 11009176 | 1/1999 |
| WO | WO 89/06908 | 8/1989 |

* cited by examiner

Primary Examiner—Anthony J. Weier
(74) Attorney, Agent, or Firm—Jiawei Huang; J.C. Patents

(57) ABSTRACT

A soybean processed food having crisp feelings of eating and good tasting is provided. The soybean processed food is produced by kneading a mixture of a soybean-derived material and a condiment in the presence of water to obtain dough, and drying the dough under a reduced pressure of 0.1 kPa to 10 kPa. It is preferred that the soybean-derived material contains isolated soybean protein as the major constituent, soybean saccharide, soybean dietary fiber, and/or soybean lecithin. According to this soybean processed food, users of all ages can easily and efficiently ingest nutrients of soybean

3 Claims, No Drawings

SOYBEAN PROCESSED FOOD AND METHOD OF PRODUCING THE SAME

BACKGROUND OF THE INVENTION

1. Field of the Invention

The present invention relates to a soybean processed food rich in nutrients of soybean, which is easy for users of all ages to eat, and a method of producing the same food.

2. Disclosure of the Prior Art

In recent years, research on nutrients of soybean has rapidly advanced on a world scale. For example, it is known that soybean protein has a plasma-cholesterol lowering effect and a blood-pressure lowering effect. The Food and Drug Administration (FDA) is authorizing the use, on food labels and in food labeling, of health claims on the association between soy protein and reduced risk of coronary heart disease (CHD). In addition, it is reported that isoflavone included in soybean is effective to prevent a serious disease such as breast cancer, prostate cancer, osteoporosis or menopausal disorders. Thus, ingesting soybean protein is indispensable to maintain health, and soybean comes to international attention.

In the past, processed foods containing soybean protein are provided in powder or granular form, and usually dispersed in water or milk to allow users to easily ingest it. Alternatively, the processed foods are often used as cooking materials. In any event, it is hard to say that the powder or granular foods of soybean protein is tasty.

In addition, as the processed foods containing soybean protein, there are tablet-type, light-meal type such as snacks, crackers, cookies, and biscuits, freeze-dry type and so on. However, when the users eat these processed foods, they often have bad feelings of eating as if the processed foods absorbed most of saliva in mouth. Thus, with respect to the feelings of eating and the solubility of food in mouth, the users are not satisfied with the existing processed foods of soybean.

For example, Japanese Patent Early Publication [kokai] No. 11-9176 discloses a method of producing a baked confectionery by baking dough including a soybean-protein containing material, tapioca starch and trehalose. However, the baked confectionery merely includes a small amount of soybean protein. In addition, since the dough is baked at a high temperature, e.g., about 180° C., there is a disadvantage that thermal denaturation of soybean protein is not avoided.

On the other hand, Japanese Patent Publication [kokoku] No. 2729323 (WO89/06908) discloses a method of producing a high protein containing nutritional food. In this method, a protein material comprising a vegetable protein material such as flour protein powder and soybean protein powder or a mixture of vegetable and animal protein materials is mixed with powder of grains and/or potatoes such as sweet corn powder, flour, potato powder and rice powder in the presence of water to obtain dough, and then the dough is dried under a reduced pressure. However, since it is essential to use the grain and/or potato powder other than protein material, there is a problem that the content of soybean protein in the nutritional food is still insufficient.

SUMMARY OF THE INVENTION

In view of these facts, a primary object of the present invention is to provide a soybean processed food rich in a soybean-derived material having crisp feelings of eating and good tastes, which is easy for users of all ages to ingest. That is, the present invention provides the soybean processed food produced by drying dough of a mixture of a soybean-derived material, condiment and water under a reduced pressure of 0.1 kPa to 10 kPa.

It is preferred that the moisture content of the soybean processed food is 4 wt % or less. It is also preferred that the soybean-derived material contains 65 wt % or more of isolated soybean protein. In addition, it is preferred that the soybean-derived material contains 10 to 30 wt % of soybean saccharide, 5 to 15 wt % of soybean dietary fiber, and 1 to 9 wt % of soybean lecithin in addition to the isolated soybean protein.

Another object of the present invention is to provide a method of producing the soybean processed food, which comprises the steps of kneading a mixture of the soybean-derived material and the condiment in the presence of water to obtain dough, and drying the dough under a reduced pressure of 0.1 kPa to 10 kPa to obtain the soybean processed food.

In the above method, it is preferred that the drying step is performed until the moisture content of the soybean processed food reaches 4 wt % or less. In addition, it is also preferred that the drying step is performed at a temperature of 50° C. to 90° C.

These and other objects and advantages will become apparent from the following detailed description and examples of the invention.

DETAILED DESCRIPTION OF THE INVENTION

A soybean processed food of the present invention contains a soybean-derived material as a major constituent thereof and a small amount of a condiment, and presents crisp feelings of eating and good tastes. The soybean processed foods is produced by kneading a mixture of the soybean-derived material and the condiment in the presence of water to obtain dough, and drying the dough under a reduced pressure of 0.1 kPa to 10 kPa.

The soybean-derived material used in the present invention comprises isolated soybean protein, soybean saccharide, soybean dietary fiber, and soybean lecithin. The condiment used in the present invention can be optionally selected from conventional seasonings and chemical condiments. For example, it is possible to use a protein hydrolysate (animal protein, vegetable protein) that is a compound obtained by hydrolyzing protein, yeast extract, meat extract (beef, chicken, pork), fish extract (tuna, shrimp, crab, seashell or the like), vegetable extract (sea tangle, shuitake), chemical condiment such as sodium glutamate, sodium inosinate and sodium guanylate, saccharide (sugar, glucose-fructose liquid sugar, glucose, fructose), sugar alcohol (maltitol, erythritol or the like), oligosaccharide (galacto-oligosaccharide, tructo-oligosaccharide or the like), sweetener having a high sugary level (licorice extract, sodium glycyrrhizinate, Stevia, aspartame or the like), sourness condiment such as citric acid, fumaric acid and malic acid, saltiness condiment such as salt and potassium chloride. Of course, a mixture of at least two or more of these condiments may be used.

To obtain the dough, compounding amounts of the soybean-derived material, condiment and water can be appropriately determined to obtain desired feelings of eating, good tastes and solubility in the user's mouth of the processed soybean food. For example, it is preferred that the compounding amount of isolated soybean protein is 65 wt % or more, preferably 65 to 84 wt %, and more preferably 65.5 to 72.5 wt % with respect to the total weight of the soybean-derived material and condiment.

When the soybean derived material contains soybean saccharide in addition to isolated soybean protein, it is preferred that the compounding amount of soybean saccharide is 10 to 30 wt %, and more preferably 10 to 15 wt % with respect to the total weight of the soybean-derived material and condiment. When the soybean derived material contains soybean dietary fiber in addition to isolated soybean protein, it is preferred that the compounding amount of soybean dietary fiber is 5 to 15 wt %, and more preferably 7.5 to 12.5 wt % with respect to the total weight of the soybean-derived material and condiment.

When the soybean derived material contains soybean lecithin in addition to isolated soybean protein, it is preferred that the compounding amount of soybean lecithin is 1 to 9 wt % and more preferably 3 to 7 wt % with respect to the total weight of the soybean-derived material and condiment. When the above-described compounding amounts of the soybean-derived material are satisfied, there is an advantage of stably providing the soybean processed food having well-balanced nutrients and crisp feelings of eating. In addition, it is possible to easily prepare the dough having good formability of the soybean processed food without adding flour and oils.

On the other hand, it is preferred that the compounding amount of the condiment is 0.01 to 20 wt % and more preferably 0.01 to 10 wt % with respect to the total weight of the soybean-derived material and condiment. When the compounding amount is less than 0.01 wt %, the tastes of the soybean processed food may be poor. When the compounding amount is more than 20 wt %, the soybean processed food may lose the tastes peculiar to soybean.

It is preferred that the compounding amount of water is 80 to 120 wt %, and more preferably about 100 wt % with respect to the total weight of the soybean-derived material and condiment. When the compounding amount is satisfied, it is possible to stably provide better properties of the dough including the formability of dough and the uniformity.

If necessary, the dough can be formed in a desired shape. For example, the dough may be formed in a sheet shape having a size of 20 to 45 mm (width)×40 to 90 mm (length)×2 to 8 mm (thickness). In case of providing a bite-sized soybean processed food to improve the easiness of eating, it is preferred that the dough is formed in the sheet shape having a compact size of 20 to 23 mm (width)×40 to 45 mm (length)×3 to 4 mm (thickness). In addition, it is preferred that a plurality of air-release holes having about 1 mm in diameter are uniformly formed in the dough. The formation of air-release holes are effective to prevent excessive expansion of the soybean processed food during the drying step explained below and provide good appearance of the soybean processed food. For example, 6 to 10 air-release holes may be formed in the dough.

Next, the dough having the desired shape is dried under a reduced pressure of 0.1 kPa to 10 kPa and more preferably 0.133 kPa, at which self freezing does not occur, to 6.67 kPa (1 to 50 Torr) to obtain the soybean processed food. The above pressure range for the drying step is essential to obtain the soybean processed food of the present invention. That is, when the dough is baked in the air, the moisture in the dough is difficult to vaporize because the soybean protein has high absorption property of water. As a result, there is a problem that the soybean processed food having a burned outer surface and a half-baked center is obtained. When the dough is dried under the atmospheric pressure, there is another problem that the soybean processed food having extremely hard feelings of eating is obtained. In addition, when the dough is dried by means of vacuum freeze drying, there is a problem that the soybean processed food having a porous structure, excessive soft feelings of eating and bad solubility in mouth is obtained.

When the drying step is performed within the above reduced pressure range, and particularly the range of 0.133 kPa to 6.67 kPa, it is possible to provide the soybean processed food having crisp feelings of eating and good solubility in mouth. In addition, it is preferred that the drying step is performed until the moisture content of the soybean processed food reaches 4 wt % or less. In this case, it is possible to provide the soybean processed food having crisp feelings of eating, proper hardness and excellent solubility in mouth.

Although the drying temperature can be appropriately determined, it is preferred to dry the dough at a temperature of 50 to 90° C. under the reduced pressure. When the drying temperature is lower than 50° C., the crisp feelings of the soybean processed food may be poor. On the other hand, when the drying temperature is higher than 90° C., there is a possibility that the soybean processed food having a burned outer surface is obtained. As the heating means, for example, it is possible to use a conventional vacuum drier with an electric heater.

The drying time period can be determined according to the moisture content in the soybean processed food, as described above. In addition, the drying time period depends on the thickness of the dough. For example, the drying step may be performed for about 2 to 5 hours.

As understood from the above, since the soybean processed food of the present invention has crisp feelings of eating, good tastes and solubility in mouth, it will be preferably ingested as health foods (functional foods) or nutrition supply snacks by users of all ages. In addition, when the soybean processed food is rich in the soybean-derived material, it is effective to prevent various diseases such as breast cancer, prostate cancer, osteoporosis, menopausal disorders, and heart disorders. In particular, when the soybean-derived material contains 65 wt % or more of isolated soybean, it is believed that the effect of preventing the heat disorders is high.

EXAMPLES 1–17

In each of Examples 1 to 17, a mixed powder of a soybean-derived material and condiments was prepared according to compounding amounts listed in Tables 1 and 2. As the soybean-derived material, isolated soybean protein was used as the major constituent, and soybean saccharide, soybean dietary fiber, and/or soybean lecithin were used as the sub constituents. As the condiments, small amounts of yeast extract and salt were used.

Next, water and half the mixed powder were put in a mixer. The amount of water is substantially equal to the total weight of the mixed powder. After the mixture of water and half the mixed powder was kneaded for 1 minute by driving the mixer at 110 rpm. Then, the balance of the mixed powder was further added into the mixer, and kneaded again for 1 minute at 110 rpm to obtain dough.

Sheets of the dough having the size of 23 mm×45 mm×4 mm (thickness) were formed by use of a rolling pin. In addition, eight holes having abort 1 mm in diameter were uniformly formed in the dough sheets. The dough sheets were put on a mesh tray, and then dried under a reduced pressure of about 0.8 kPa (=6 Torr) at a temperature of about 80° C. by use of a conventional vacuum drier until the moisture content in the dough reaches 4 wt % or less. In these examples, the drying time is about 3.5 hours.

With respect to items of formability of dough, tastes and feelings of eating, the soybean processed foods of Examples were evaluated by randomly-selected fifteen subjects. Results are shown in Tables 1 and 2.

As shown in Tables 1 and 2, all of Examples demonstrate good crisp feelings of eating and tastes. In addition, the results indicate that the soybean processed foods (Examples 4 to 6, 11–13) containing 7.5 to 12.5 wt % of soybean dietary fiber, and 3.0 to 7.0 wt % of soybean lecithin are excellent in all of the evaluation items.

EXAMPLE 18–23

And Comparative Examples 1–4

In these Examples and Comparative Examples, the dough sheet prepared as in the case of the Example 5 was used, and the step of drying the dough sheet was performed under different conditions, as shown in Table 3. That is, the drying steps of Examples 18–23 were performed within a pressure range of 0.133 kPa to 6.67 kPa. The drying step of Comparative Example 1 was performed under 13.3 kPa in the vacuum drier. The drying step of Comparative Example 2 was perforated under 0.0133 kPa by use of a freeze dryer. The drying step of Comparative Example 3 was performed under 101.3 kPa by hot-air drying. The drying step of Comparative Example 4 was performed under 101.3 kPa by means of conventional baking.

With respect to the items of feelings of eating, solubility in mouth and tastes, the soybean processed foods of Examples and Comparative Examples were evaluated by randomly-selected fifteen subjects. Results are shown in Table 3.

As shown in Table 3, Examples 18 to 23 using the vacuum drying within the pressure range of the present invention present the soybean processed foods having better feelings of eating, solubility in mouth and tastes than Comparative Example 1 where the vacuum drying was performed beyond the present pressure range, and Comparative Examples 2 to 4 using drying methods other than the vacuum drying In particular, when the vacuum drying is performed under 0.667 kPa or 0.933 kPa (5 or 7 Torr), the soybean processed foods (Examples 20, 21) are excellent in all of the evaluation items. When using the hot-air drying, the soybean processed food is extremely poor in feelings of eating. When using the freeze dryer, the soybean processed food is not bad in tastes, but both of the feelings of eating and the solubility in mouth are poor. In addition, when using the conventional baking, bad results are obtained in all of the evaluation items.

Thus, the present invention has achieved success in the development of the soybean processed food rich in the soybean-derived material having crisp feelings of eating and good tastes while minimizing the compounding amount of condiments. According to the soybean processed food of the present invention, the users (consumer) of all ages call easily and efficiently ingest the nutrients of soybean. In particular, the soybean processed food containing 65 wt % or more of isolated soybean protein is expected as a health nutritional food for preventing various diseases such as breast cancer, prostate cancer, osteoporosis, menopausal disorders, and heart disorders.

TABLE 1

| Composition (wt %) and Evaluation | Examples | | | | | | | |
|---|---|---|---|---|---|---|---|---|
| | 1 | 2 | 3 | 4 | 5 | 6 | 7 | 8 |
| isolated soybean protein | 72.5 | 70.0 | 70.0 | 70.0 | 70.0 | 67.5 | 67.5 | 65.0 |
| soybean saccharide | 19.9 | 19.9 | 17.4 | 14.9 | 12.4 | 12.4 | 9.9 | 9.9 |
| soybean dietary fiber | 0 | 2.5 | 5.0 | 7.5 | 10.0 | 12.5 | 15.0 | 17.5 |
| soybean lecithin | 5.0 | 5.0 | 5.0 | 5.0 | 5.0 | 5.0 | 5.0 | 5.0 |
| condiment | | | | | | | | |
| yeast extract | 1.9 | 1.9 | 1.9 | 1.9 | 1.9 | 1.9 | 1.9 | 1.9 |
| salt | 0.7 | 0.7 | 0.7 | 0.7 | 0.7 | 0.7 | 0.7 | 0.7 |
| formability of dough | Δ | Δ | ○ | ◉ | ◉ | ◉ | ○ | Δ |
| feelings of eating | Δ | Δ | ○ | ◉ | ◉ | ◉ | ○ | Δ |
| tastes | ○ | ○ | ○ | ◉ | ◉ | ◉ | ○ | ○ |

◉ "very good", ○ "good", Δ "medium"

TABLE 2

| Composition (wt %) and Evaluation | Examples | | | | | | | | |
|---|---|---|---|---|---|---|---|---|---|
| | 9 | 10 | 11 | 12 | 13 | 14 | 15 | 16 | 17 |
| isolated soybean protein | 70.0 | 70.0 | 70.0 | 70.0 | 70.0 | 67.5 | 65.0 | 72.5 | 67.5 |
| soybean saccharide | 17.4 | 16.4 | 14.4 | 12.4 | 10.4 | 10.9 | 11.4 | 24.9 | 29.9 |
| soybean dietary fiber | 10.0 | 10.0 | 10.0 | 10.0 | 10.0 | 10.0 | 10.0 | 0 | 0 |
| soybean lecithin | 0 | 1.0 | 3.0 | 5.0 | 7.0 | 9.0 | 11.0 | 0 | 0 |
| condiment | | | | | | | | | |
| yeast extract | 1.9 | 1.9 | 1.9 | 1.9 | 1.9 | 1.9 | 1.9 | 1.9 | 1.9 |
| salt | 0.7 | 0.7 | 0.7 | 0.7 | 0.7 | 0.7 | 0.7 | 0.7 | 0.7 |
| formability of dough | Δ | ○ | ◉ | ◉ | ◉ | ○ | ○ | Δ | Δ |

TABLE 2-continued

| Composition (wt %) and | Examples | | | | | | | | |
|---|---|---|---|---|---|---|---|---|---|
| Evaluation | 9 | 10 | 11 | 12 | 13 | 14 | 15 | 16 | 17 |
| feelings of eating | Δ | ○ | ⊚ | ⊚ | ⊚ | ○ | Δ | Δ | Δ |
| tastes | ○ | ○ | ⊚ | ⊚ | ⊚ | ○ | ○ | ○ | ○ |

⊚ "very good", ○ "good", Δ "medium"

TABLE 3

| Drying condition/ | Examples | | | | | | Comparative Examples | | | |
|---|---|---|---|---|---|---|---|---|---|---|
| Evaluation | 18 | 19 | 20 | 21 | 22 | 23 | 1 | 2 | 3 | 4 |
| Drying method | vacuum drying | | | | | | | freeze drying | hot-air drying | baking |
| Pressure | | | | | | | | | | |
| (kPa) | 0.133 | 0.4 | 0.667 | 0.933 | 1.2 | 6.67 | 13.3 | 0.0133 | 101.3 | 101.3 |
| (Torr) | 1 | 3 | 5 | .7 | 9 | 50 | 100 | 0.1 | 760 | 760 |
| feelings of eating | ○ | ○ | ⊚ | ⊚ | ○ | Δ | X | X | X | X |
| solubility in mouth | Δ | ○ | ⊚ | ⊚ | ⊚ | ○ | ○ | X | Δ | X |
| tastes | ⊚ | ⊚ | ⊚ | ⊚ | ⊚ | ⊚ | ⊚ | ○ | Δ | X |

⊚ "very good", ○ "good", Δ "medium", X "bad"

What is claimed is:

1. A soybean processed food produced by drying a dough of a mixture of a soybean-derived material including isolated soybean protein, soybean dietary fiber and soybean lecithin, condiment and water under a reduced pressure of 0.1 kPa to 10 kPa,
   wherein a compounding amount of said isolated soybean protein is 65 wt % or more with respect to total weight of said soybean-derived material and the condiment,
   a compounding amount of said soybean dietary fiber is 5 to 15 wt % with respect to the total weight of said soybean-derived material and the condiment, and
   a compounding amount of said soybean lecithin is 1 to 9 wt % with respect to the total weight of said soybean-derived material and the condiment.

2. The soybean processed food as set forth in claim 1, wherein a moisture content of said soybean processed food is 4 wt % or less.

3. The soybean processed food as set forth in claim 1, wherein said soybean-derived material contains 9.9 to 17.4 wt % of soybean saccharide.

* * * * *